(12) United States Patent
Erickson et al.

(10) Patent No.: US 6,846,450 B2
(45) Date of Patent: Jan. 25, 2005

(54) METHOD FOR MAKING A NONWOVEN WEB

(75) Inventors: Stanley C. Erickson, Scandia, MN (US); James C. Breister, Oakdale, MN (US); Michael G. Schwartz, Hugo, MN (US); Patrick J Sager, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 151 days.

(21) Appl. No.: 10/177,446

(22) Filed: Jun. 20, 2002

(65) Prior Publication Data

US 2003/0236046 A1 Dec. 25, 2003

(51) Int. Cl.[7] .................. D01D 5/084; D01D 5/088; D04H 3/02
(52) U.S. Cl. .................. 264/555; 264/103; 264/211.14; 264/211.17
(58) Field of Search ............... 264/103, 211.14, 264/211.17, 555

(56) References Cited

U.S. PATENT DOCUMENTS

| | | |
|---|---|---|
| 3,016,599 A | 1/1962 | Perry, Jr. |
| 3,498,230 A | 3/1970 | Schippers |
| 3,571,679 A | 3/1971 | Van Turnhout |
| 3,971,373 A | 7/1976 | Braun |
| 4,111,531 A | 9/1978 | Lavelle et al. |
| 4,215,682 A | 8/1980 | Kubik et al. |
| 4,285,655 A | 8/1981 | Matsubara |
| 4,818,463 A * | 4/1989 | Buehning ............. 264/555 X |
| 4,889,476 A | 12/1989 | Buehning |
| 4,988,560 A | 1/1991 | Meyer et al. |
| 4,995,333 A | 2/1991 | Keller et al. |
| 5,124,111 A | 6/1992 | Keller et al. |
| 5,236,641 A | 8/1993 | Allen et al. |
| 5,248,247 A | 9/1993 | Rubhausen et al. |
| 5,260,003 A | 11/1993 | Nyssen et al. |
| 5,354,529 A | 10/1994 | Berger et al. |
| 5,582,907 A | 12/1996 | Pall |
| 5,618,566 A | 4/1997 | Allen et al. |
| 5,637,331 A | 6/1997 | Lenk et al. |
| 5,648,041 A | 7/1997 | Rodgers et al. |
| 5,728,219 A | 3/1998 | Allen et al. |
| 5,728,407 A | 3/1998 | Matsui |

(List continued on next page.)

FOREIGN PATENT DOCUMENTS

| | | |
|---|---|---|
| DE | 29 33 025 A1 | 3/1981 |
| EP | 417 815 A1 | 3/1991 |
| EP | 0822282 A2 | 2/1998 |
| JP | 9-109229 A | 4/1997 |
| WO | WO 9932692 A1 | 7/1999 |

OTHER PUBLICATIONS

Ito, "Design of Coat–Hanger Die Considering Residence Time," *Japan Plastics*, 28(2):43–47 (1977).
Wen, S. H. et al., "Extrusion Die Design For Multiple Stripes," *Polymer Engineering and Science*, 35(9):759–767 (1995).
Winter et al., "Design for Dies for the Extrusion of Sheets and Annular Parisons: The Distribution Problem," ANTEC '84 Conference Proceedings, pp. 49–51, 1984.

*Primary Examiner*—Leo B. Tentoni

(57) ABSTRACT

Melt blown or spun bond nonwoven webs are formed by flowing fiber-forming material through a die cavity having a substantially uniform residence time and then through a plurality of orifices to form filaments, using air or other fluid to attenuate the filaments into fibers and collecting the attenuated fibers as a nonwoven web. Each die orifice receives a fiber-forming material stream having a similar thermal history. The physical or chemical properties of the nonwoven web fibers such as their average molecular weight and polydispersity can be made more uniform. Wide nonwoven webs can be formed by arranging a plurality of such die cavities in a side-by-side relationship. Thicker or multilayered nonwoven webs can be formed by arranging a plurality of such die cavities atop one another.

21 Claims, 6 Drawing Sheets

U.S. PATENT DOCUMENTS

| | | |
|---|---|---|
| 5,740,963 A | 4/1998 | Riney et al. |
| 5,863,565 A | 1/1999 | Rossillon et al. |
| 5,891,482 A | 4/1999 | Choi |
| 5,902,531 A | 5/1999 | Berger et al. |
| 5,951,942 A | 9/1999 | Rossillon et al. |
| 5,993,943 A | 11/1999 | Bodaghi et al. |
| 6,057,256 A | 5/2000 | Krueger et al. |
| 6,182,732 B1 | 2/2001 | Allen |
| 6,210,141 B1 | 4/2001 | Allen |
| 6,220,843 B1 | 4/2001 | Allen |
| 6,296,463 B1 | 10/2001 | Allen |
| 6,336,801 B1 | 1/2002 | Fish et al. |

* cited by examiner

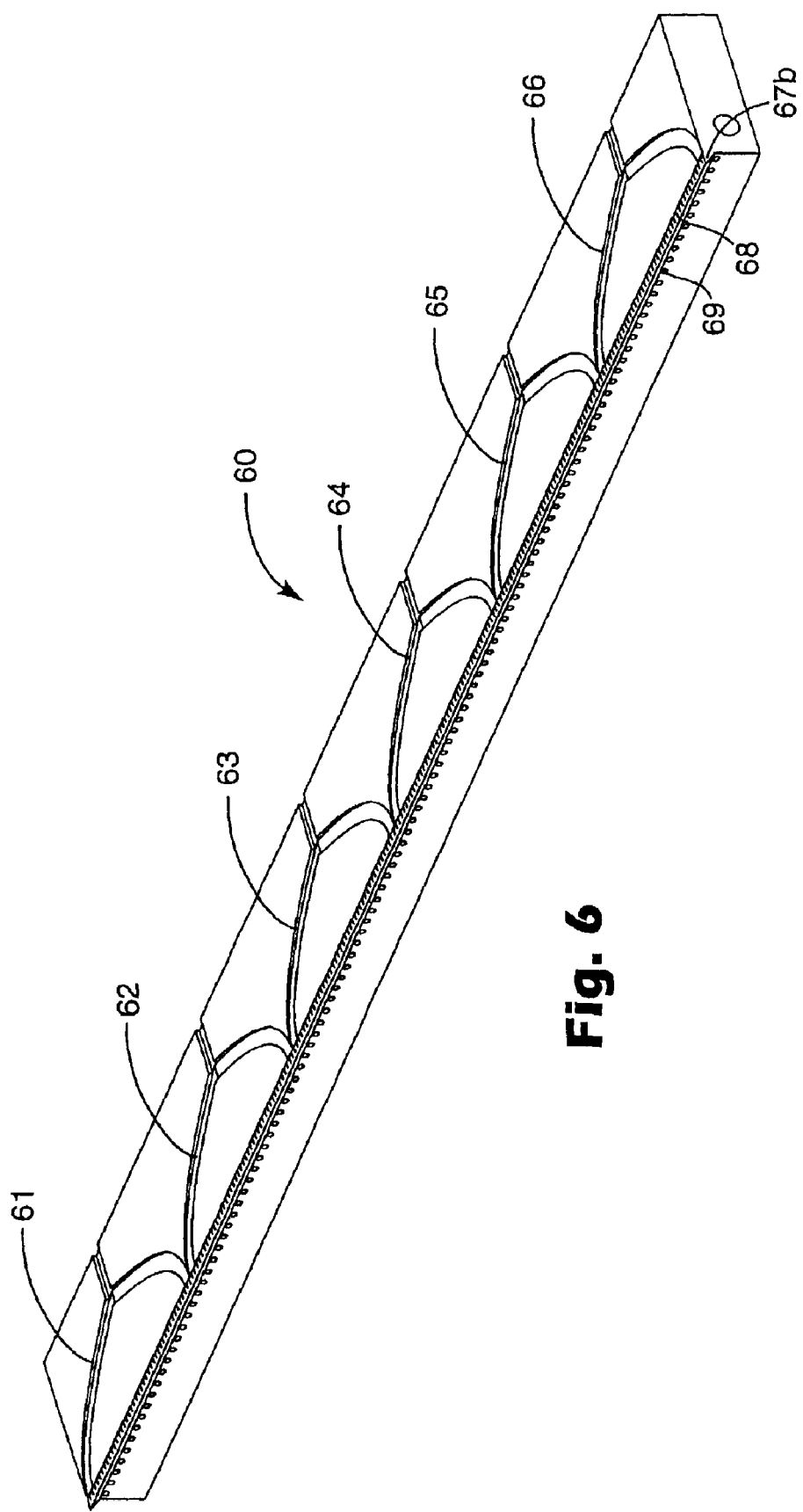

METHOD FOR MAKING A NONWOVEN WEB

FIELD OF THE INVENTION

This invention relates to devices and methods for preparing nonwoven webs, and to melt blown or spun bonded fibrous nonwoven webs.

BACKGROUND

Nonwoven webs typically are formed using a meltblowing process in which filaments are extruded from a series of small orifices while being attenuated into fibers using hot air or other attenuating fluid. The attenuated fibers are formed into a web on a remotely-located collector or other suitable surface. A spun bond process can also be used to form nonwoven webs. Spun bond nonwoven webs typically are formed by extruding molten filaments from a series of small orifices, exposing the filaments to a quench air treatment that solidifies at least the surface of the filaments, attenuating the at least partially solidified filaments into fibers using air or other fluid and collecting and optionally calendaring the fibers into a web. Spun bond nonwoven webs typically have less loft and greater stiffness than melt blown nonwoven webs, and the filaments for spun bond webs typically are extruded at lower temperatures than for melt blown webs.

There has been an ongoing effort to improve the uniformity of nonwoven webs. Web uniformity typically is evaluated based on factors such as basis weight, average fiber diameter, web thickness or porosity. Process variables such as material throughput, air flow rate, die to collector distance, and the like can be altered or controlled to improve nonwoven web uniformity. In addition, changes can be made in the design of the meltblowing or spun bond apparatus. References describing such measures include U.S. Pat. Nos. 4,889,476, 5,236,641, 5,248,247, 5,260,003, 5,582,907, 5,728,407, 5,891,482 and 5,993,943.

Despite many years of effort by various researchers, fabrication of commercially suitable nonwoven webs still requires careful adjustment of the process variables and apparatus parameters, and frequently requires that trial and error runs be performed in order to obtain satisfactory results. Fabrication of uniform wide nonwoven webs and of ultrafine fiber webs can be especially difficult.

BRIEF DESCRIPTION OF THE DRAWING

FIG. 6 is a schematic perspective sectional view of an array of die cavities of the invention in a side-by-side relationship.

SUMMARY OF THE INVENTION

Figure 1:
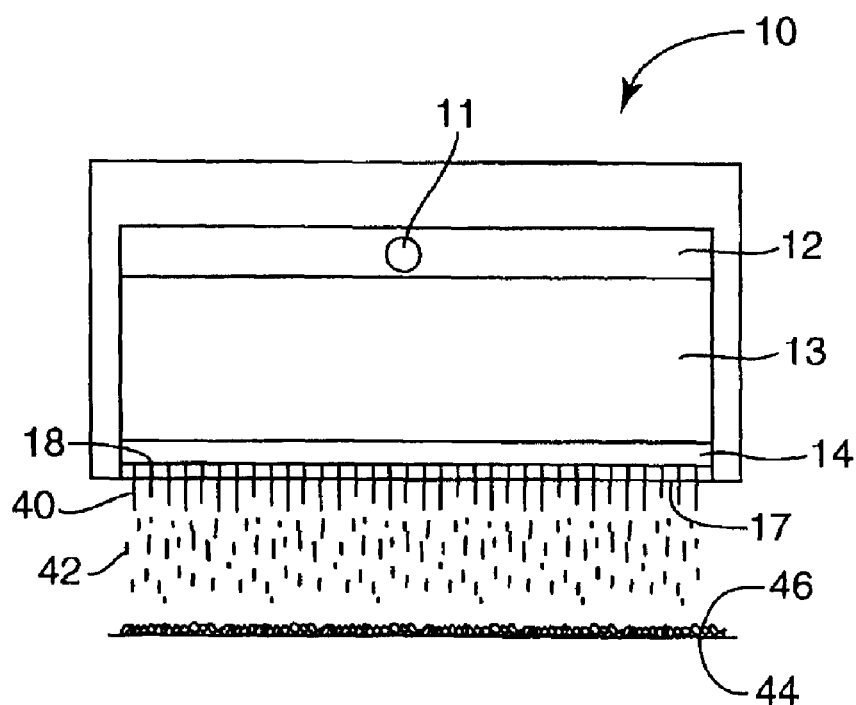
FIG. 1 is a schematic top sectional view of a conventional tee slot meltblowing die.

Although useful, macroscopic nonwoven web properties such as basis weight, average fiber diameter, web thickness or porosity may not always provide a sufficient basis for evaluating nonwoven web quality or uniformity. These macroscopic web properties typically are determined by cutting small swatches from various portions of the web or by using sensors to monitor portions of a moving web. These approaches can be susceptible to sampling and measurement errors that may skew the results, especially if used to evaluate low basis weight or highly porous webs. In addition, although a nonwoven web may exhibit uniform measured basis weight, fiber diameter, web thickness or porosity, the web may nonetheless exhibit nonuniform performance characteristics due to differences in the intrinsic properties of the individual web fibers. Meltblowing and spun bonding processes subject the fiber-forming material to appreciable viscosity reduction (and sometimes to considerable thermal degradation), especially during passage of the fiber-forming material through the die and during the subsequent attenuation step. A more uniform nonwoven web could be obtained if each filament had the same or substantially the same physical or chemical properties as it exited the die. Uniformity of such physical or chemical properties can be facilitated by subjecting the fiber-forming material to the same or substantially the same residence time throughout the die, thereby exposing the fiber-forming material to a more uniform thermal history as it passes through the various regions of the die. The resulting filaments may have more uniform physical or chemical properties from filament to filament and after attenuation and collection may form higher quality or more uniform nonwoven webs.

The desired filament physical property uniformity preferably is evaluated by determining one or more intrinsic physical or chemical properties of the collected fibers, e.g., their weight average or number average molecular weight, and more preferably their molecular weight distribution. Molecular weight distribution can conveniently be characterized in terms of polydispersity. By measuring properties of fibers rather than of web swatches, sampling errors are reduced and a more accurate measurement of web quality or uniformity can be obtained.

The present invention provides, in one aspect, a method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web. In a preferred embodiment, the method employs a plurality of such die cavities arranged to provide a wider or thicker web than would be obtained using only a single such die cavity.

In another aspect, the invention provides a nonwoven web-forming apparatus comprising a die cavity having a substantially uniform residence time for fiber-forming material flowing through the die cavity, a plurality of filament-forming orifices at the exit from the die cavity, a conduit that can supply a stream of air or other fluid to attenuate the filaments into fibers, and a collector and optional calendaring device on which a layer of the attenuated fibers can form into a nonwoven web. In a preferred embodiment, the apparatus comprises a plurality of such die cavities arranged to provide a wider or thicker web than would be obtained using only a single such die cavity.

In a particularly preferred embodiment of the above-described method and apparatus, the die cavities are part of a meltblowing die and the attenuating fluid is heated.

In a further aspect, the invention provides a nonwoven web having a width of at least about 0.5 meters and comprising at least one layer of melt blown or spun bond fibers having substantially uniform polydispersity.

In yet a further aspect, the invention provides a nonwoven web comprising at least one layer of melt blown ultrafine fibers having an average fiber diameter less than about 5 micrometers and substantially uniform polydispersity.

DETAILED DESCRIPTION

As used in this specification, the phrase "nonwoven web" refers to a fibrous web characterized by entanglement or point bonding of the fibers, and preferably having sufficient coherency and strength to be self-supporting.

The term "meltblowing" means a method for forming a nonwoven web by extruding a fiber-forming material through a plurality of orifices to form filaments while contacting the filaments with air or other attenuating fluid to attenuate the filaments into fibers and thereafter collecting a layer of the attenuated fibers.

The phrase "meltblowing temperatures" refers to the meltblowing die temperatures at which meltblowing typically is performed. Depending on the application, meltblowing temperatures can exceed 315° C., 325° C. or even 335° C.

The phrase "spun bond process" means a method for forming a nonwoven web by extruding a low viscosity melt through a plurality of orifices to form filaments, quenching the filaments with air or other fluid to solidify at least the surfaces of the filaments, contacting the at least partially solidified filaments with air or other fluid to attenuate the filaments into fibers and collecting and optionally calendaring a layer of the attenuated fibers.

The phrase "nonwoven die" refers to a die for use in meltblowing or the spun bond process.

The phrase "attenuate the filaments into fibers" refers to the conversion of a segment of a filament into a segment of greater length and smaller diameter.

The phrase "melt blown fibers" refers to fibers made using meltblowing. The aspect ratio (ratio of length to diameter) of melt blown fibers is essentially infinite (e.g., generally at least about 10,000 or more), though melt blown fibers have been reported to be discontinuous. The fibers are long and entangled sufficiently that it is usually impossible to remove one complete melt blown fiber from a mass of such fibers or to trace one melt blown fiber from beginning to end.

The phrase "spun bond fibers" refers to fibers made using a spun bond process. Such fibers are generally continuous and are entangled or point bonded sufficiently that it is usually impossible to remove one complete spun bond fiber from a mass of such fibers.

The term "polydispersity" refers to the weight average molecular weight of a polymer divided by the number average molecular weight of the polymer, with both weight average and number average molecular weight being evaluated using gel permeation chromatography and a polystyrene standard.

The phrase "fibers having substantially uniform polydispersity" refers to melt blown or spun bond fibers whose polydispersity differs from the average fiber polydispersity by less than ±5%.

The phrase "shear rate" refers to the rate in change of velocity of a nonturbulent fluid in a direction perpendicular to the velocity. For nonturbulent fluid flow past a planar boundary, the shear rate is the gradient vector constructed perpendicular to the boundary to represent the rate of change of velocity with respect to distance from the boundary.

The phrase "residence time" refers to the flow path of a fiber-forming material stream through a die cavity divided by the average stream velocity.

The phrase "substantially uniform residence time" refers to a calculated, simulated or experimentally measured residence time for any portion of a stream of fiber-forming material flowing through a die cavity that is no more than twice the average calculated, simulated or experimentally measured residence time for the entire stream.

Figure 2:
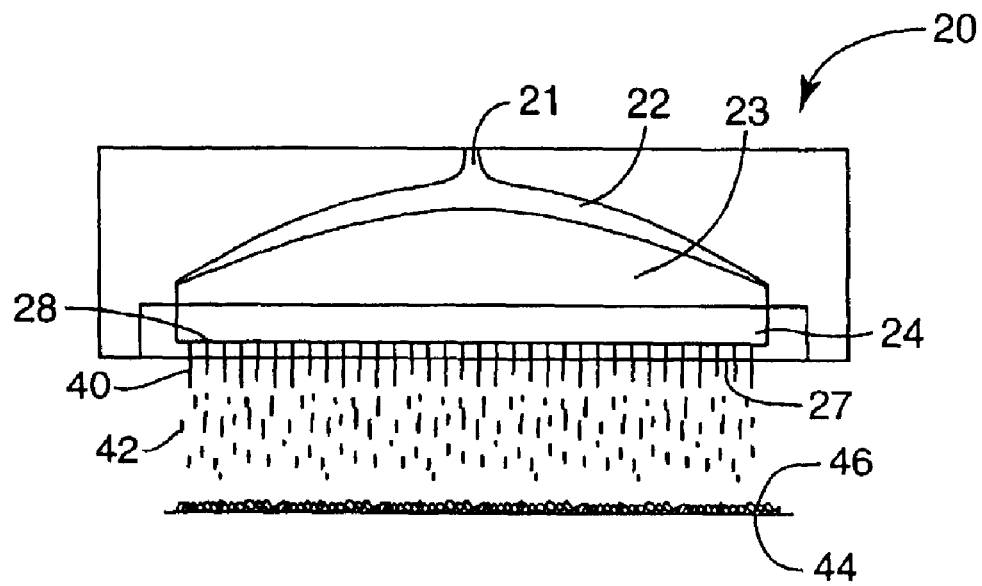
FIG. 2 is a schematic top sectional view of a conventional coathanger meltblowing die.

Referring to FIG. 1 and FIG. 2, meltblowing typically is carried out using a "tee slot" die 10 such as is shown in FIG. 1 or a "coathanger" die 20 such as is shown in FIG. 2. Fiber-forming material enters through inlet 11 or 21 and flows through manifold 12 or 22, slot 13 or 23 and die lip area 14 or 24. The fiber-forming material (which undergoes considerable heat-induced thinning and sometimes thermal degradation and a molecular weight change due to passage through the die cavity) exits the die 10 or 20 at die tip 17 or 27 through a row of side-by-side orifices 18 or 28 drilled or machined in die tip 17 or 27 to produce a series of filaments 40. High velocity attenuating fluid (e.g., air) is supplied under pressure to orifices (not visible in FIG. 1 or FIG. 2) adjacent die tips 17 or 27. The fluid attenuates the filaments into fibers by impinging upon, drawing down and possibly tearing or separating the filaments 40 into a stream of elongated and reduced diameter fibers 42. The fibers 42 are collected at random on a remotely-located collector such as a moving screen 44 or other suitable surface to form a coherent entangled web 46. Web uniformity typically is controlled by adjusting the relative balance of inlet and outlet pressures at the die and by adjusting the temperature profile across the die, in order to obtain approximately uniform fiber diameters. The temperature profile adjustment usually is made with the aid of electrical heating units embedded at various locations in the die. These approaches to web uniformity control have limitations, due in part to the different shear rate history, temperatures and residence times experienced by the fiber-forming material in different regions of the die.

Further details regarding conventional meltblowing can be found, for example, in Wente, Van A., "Superfine Thermoplastic Fibers" in Industrial Engineering Chemistry, Vol. 48, p. 1342 et seq. (1956), or in Report No. 4364 of the Naval Research Laboratories, published May 25, 1954, entitled "Manufacture of Superfine Organic Fibers," by Wente, V. A.; Boone, C, D.; and Fluharty, E. L.

Figure 3:
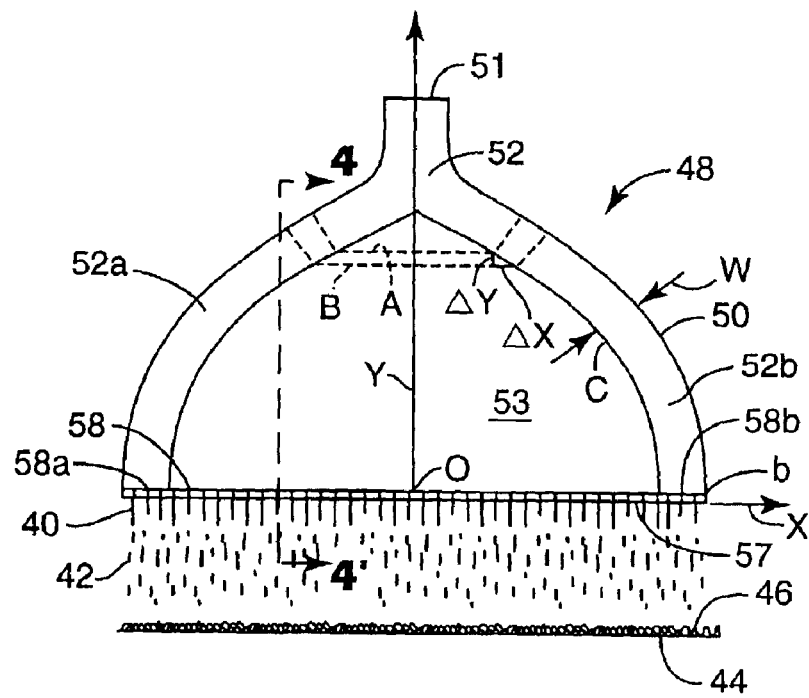
FIG. 3 is a schematic top sectional view of a meltblowing die of the invention.

A nonwoven die 48 of the invention for use in meltblowing is shown in a schematic top sectional view in FIG. 3. Fiber-forming material enters die cavity 50 through inlet 51 and flows through manifold 52 along manifold arm 52a or 52b. Manifold arms 52a and 52b preferably have a constant width and variable depth. Some of the fiber-forming material exits die cavity 50 by passing through manifold arm 52a or 52b and through orifices such as orifice 58a or 58b machined or drilled in die tip 57. The remaining fiber-forming material exits die cavity 50 by passing from manifold arm 52a or 52b into slot 53 and through orifices such as orifice 58 in die tip 57. The exiting fiber-forming material produces a series of filaments 40. A plurality of high velocity attenuating fluid streams supplied under pressure from orifices (not visible in FIG. 3) near die tip 57 attenuate the filaments 40 into fibers 42. The fibers 42 are collected at random on a remotely-located collector such as a moving screen 44 or other suitable surface to form a coherent entangled nonwoven web 46.

Figure 4:
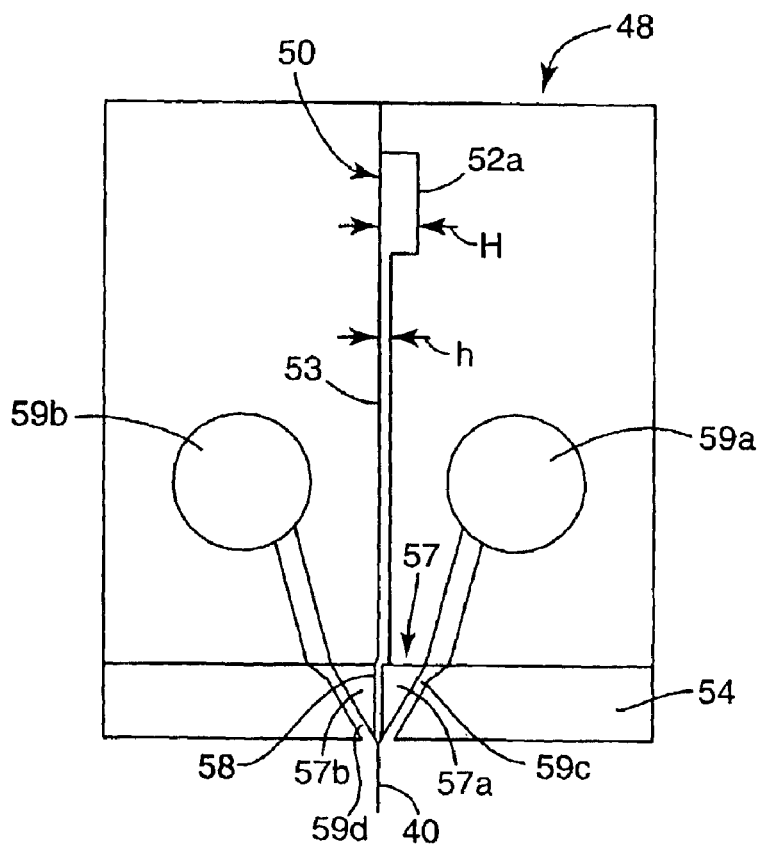
FIG. 4 is a sectional view of the die of FIG. 3, taken along the line 4–4'.

FIG. 4 shows a cross-sectional view of the die 48 of FIG. 3, taken along the line 4–4'. Manifold arm 52a has a variable depth H that ranges from a maximum near inlet 51 to a minimum near the ends of manifold arms 52a and 52b. Slot 53 has fixed depth h. Fiber-forming material passes from manifold arm 52a into slot 53 and exits die cavity 50 through orifice 58 in die tip 57 as filament 40. Air knife 54 overlays die tip 57. Die tip 57 is removable and preferably is split into two matching halves 57a and 57b, permitting ready alteration in the size, arrangement and spacing of the orifices 58. A pressurized stream of attenuating fluid can be supplied from plenums 59a and 59b in the exit face of die 48 through orifices 59c and 59d in air knife 54 to attenuate the extruded filaments 40 into fibers.

Figure 5:
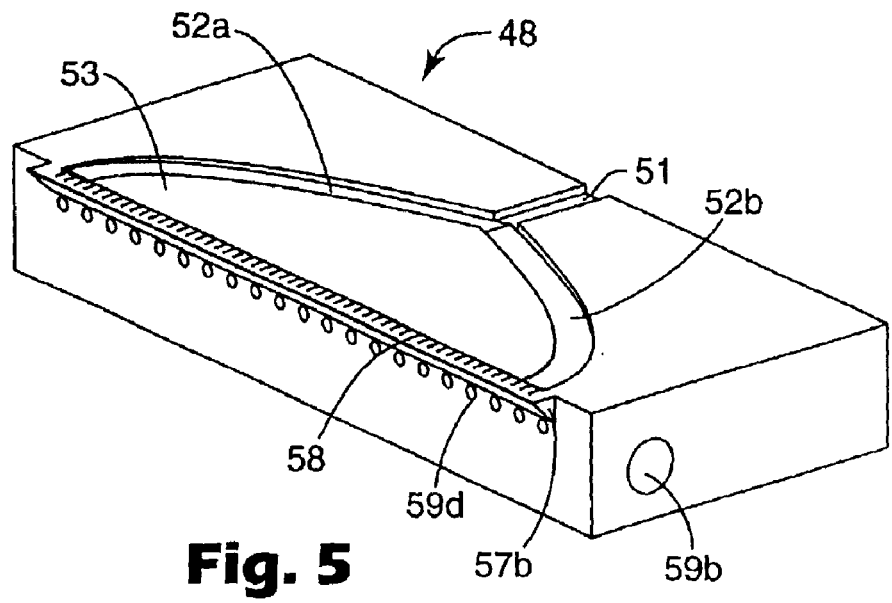
FIG. 5 is a schematic perspective sectional view of the die of FIG. 3.

FIG. 5 shows a perspective sectional view of meltblowing die 48. For clarity, only the lower half 57b of die tip 57 is shown, and air knife 54 has been omitted from FIG. 5. The remaining elements of FIG. 5 are as in FIG. 3 and FIG. 4.

Die cavity 50 can be designed with the aid of equations discussed in more detail below. The equations can provide an optimized nonwoven die cavity design having a uniform residence time for fiber-forming material passing through the die cavity. Preferably the design provides a uniform or relatively uniform shear rate history for fiber-forming material streams passing through the die cavity. The filaments exiting the die cavity preferably have uniform physical or chemical properties after they have been attenuated, collected and cooled to form a nonwoven web.

In comparison to the dies illustrated in FIG. 1 and FIG. 2, meltblowing die 48 is much deeper from the fiber-forming material inlet to the filament outlet for a given die cavity width. Die cavity 50 may be scaled to a variety of sizes to form nonwoven webs of various desired web widths. However, forming wide webs (e.g., widths of about one-half meter or more) from a single such meltblowing die would require a very deep die cavity that could exhibit excessive pressure drop. Wide webs of the invention preferably have widths of 0.5, 1, 1.5 or even 2 meters or more and preferably are formed using a plurality of die cavities arranged to provide a wider web than would be obtained using only a single such die cavity. For example, when using a nonwoven die of the invention that is substantially planar, then a plurality of die cavities preferably are arranged in a side-by-side relationship within the die to form wide webs.

FIG. 6 illustrates a meltblowing die 60 of the invention incorporating a side-by-side arrangement of contiguous die cavities 61 through 66 like the die cavity shown in FIG. 3. Die 60 can form a web whose width is six times the width of an individual die cavity. For clarity, only the bottom half 67b of the die tip is shown in FIG. 6, and the overlying air knife that would direct pressurized attenuating fluid from orifices such as orifice 69 has been omitted from FIG. 6. Die tip 67b preferably is machined to provide the lower half of a plurality of orifices such as orifice 68. A die such as that shown in FIG. 6 enables the arrangement of a plurality of narrow die cavities (having, for example, widths less than 0.5, less than 0.33, less than 0.25 or less than 0.1 meters) in a side-by-side array that may form uniform or substantially uniform nonwoven webs having widths of one meter or more. Compared to the use of a single wider and deeper die cavity, the use of a plurality of side-by side die cavities may reduce the overall depth of the die from front to back and may reduce the pressure drop from the die inlet to the die outlet.

Figure 7:
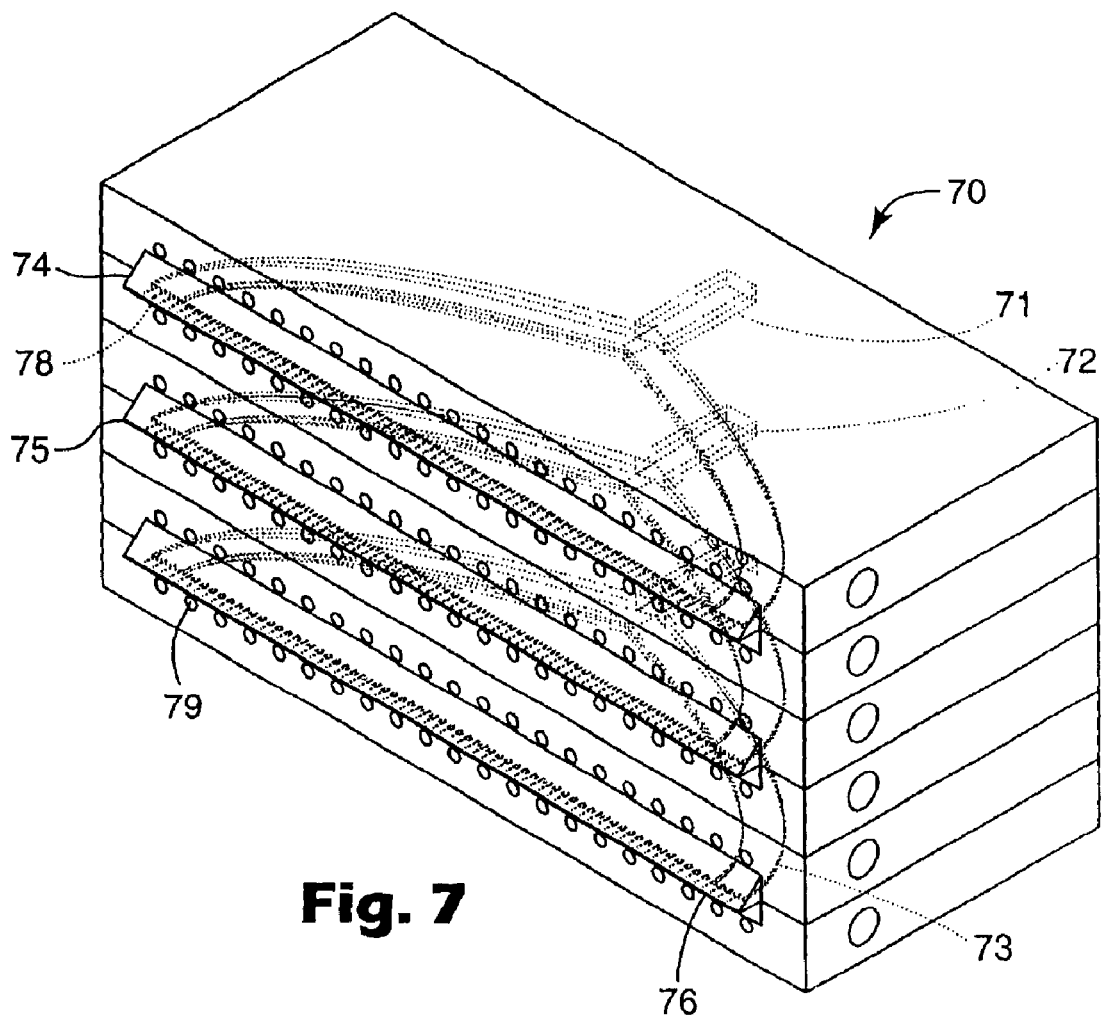
FIG. 7 is a schematic perspective sectional view, partially in phantom, of an array of die cavities of the invention in a vertically stacked relationship.

Die cavities like those shown in FIG. 3 may also be arranged to provide a thicker web than would be obtained using only a single such die cavity. For example, when using nonwoven dies of the invention that are substantially planar, then a plurality of such die cavities preferably are arranged in a stack to form thick webs. FIG. 7 illustrates a meltblowing die 70 of the invention incorporating a vertical stack of die cavities 71, 72 and 73. For clarity, die tips 74, 75 and 76 are shown without the overlying air knives that would direct attenuating fluid from orifices such as orifice 79 onto the filaments exiting orifices such as orifice 78 in die tip 74. Die 70 may be used to form three contiguous nonwoven web layers each containing a layer of entangled, attenuated melt blown fibers.

For nonwoven dies of the invention employing a plurality and especially an array of die cavities, it often will be preferred to supply identical volumes of the same fiber-forming material to each die cavity. In such cases, the fiber-forming material preferably is supplied using a planetary gear metering pump as described in copending application Ser. No. 10/177,419 entitled "MELTBLOWING APPARATUS EMPLOYING PLANETARY GEAR METERING PUMP", filed Jun. 20, 2002, the disclosure of which is incorporated herein by reference. For example, a planetary gear metering pump could be used to supply fiber-forming material to each of die cavities 61 through 66 of die 60 in FIG. 6, or to two or more of die cavities 71, 72 and 73 of die 70 in FIG. 7.

For meltblowing applications, it may also be preferred to supply identical streams of attenuating fluid to each extruded filament. In such cases, the attenuating fluid preferably is supplied using an adjustable attenuating fluid manifold as described in copending application Ser. No. 10/177,814 entitled "ATTENUATING FLUID MANIFOLD FOR MELTBLOWING DIE", filed Jun. 20, 2002, the disclosure of which is incorporated herein by reference.

Figure 8:
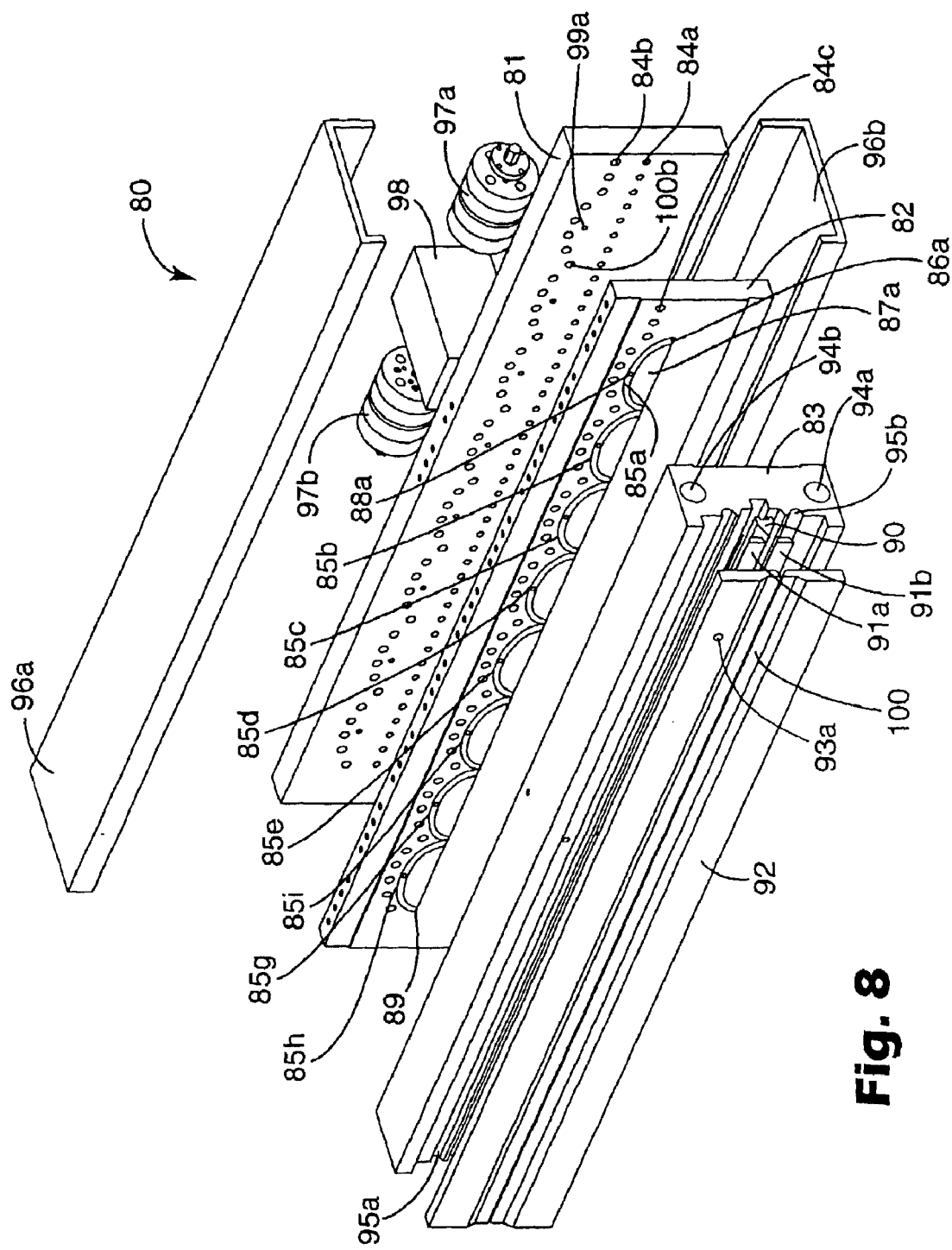
FIG. 8 is an exploded view of another meltblowing die of the invention.

In a preferred embodiment of the invention, the die cavity outlet is angled away from the plane of the die slot. FIG. 8 shows an exploded perspective view of one such configuration for a meltblowing die 80 of the invention. Die 80 includes upright base 81 which is fastened to die body 82 via bolts (not shown in FIG. 8) through bolt holes such as hole 84a. Die body 82 and base 81 are fastened to air manifold 83 via bolts (also not shown in FIG. 8) through bolt holes such as holes 84b and 84c. Die body 82 includes a contiguous array of eight die cavities 85a through 85h like that shown in FIG. 3, each of which preferably is machined to identical dimensions. Die cavities 85a through 85h share a common die land 89. Die cavity 85a includes manifold 86a, slot 87a and inlet port 88a. Similar components are found in die cavities 85b thorough 85h. Die tip 90 is held in place on air manifold 83 by clamps 91a and 91b. Air knife 92 is fastened to air manifold 83 via bolts (not shown in FIG. 8) through bolt holes such as hole 93a. Air manifold 83 includes inlet ports 94a and 94b through which air can be conducted via internal passages (not shown in FIG. 8) to plenums 95a and 95b and thence to air knife 92. Insulation pads 96a and 96b help maintain apparatus 80 at a uniform temperature. During operation of die 80, two 4-port planetary gear metering pumps 97a and 97b supply fiber-forming material through distribution chamber 98. The use of two pumps facilitates conversion of apparatus 80 to other configurations, e.g., as a die for extrusion of multilayer webs or for extrusion of bicomponent fibers. The fiber-forming material is conducted via internal passages (not shown in FIG. 8) in base 81 through ports such as port 99a and then through ports such as port 88a into die cavities 85a through

85*h*. After passing through the manifolds such as manifold 86*a* and through the die slots such as slot 87*a*, the fiber-forming material passes over die land 89 and makes a right angle turn into a slit (not shown in FIG. 8) in air manifold 83. Because of the arrangement of components and parting lines in die 80, die cavities 85*a* through 85*h* are surrounded by machined metal surfaces of ample width that can be firmly clamped to base 81 and air manifold 83. Normally, it would be difficult to place heat input devices in some regions of a die design like that shown in FIG. 8. However, for reasons explained in more detail below, preferred nonwoven dies of the invention can be operated with reduced reliance on such heat input devices. This provides greater flexibility in the overall die design and enables the major components, machined surfaces and parting lines in the die to be arranged in a configuration that can be repeatedly assembled and disassembled for cleaning while reducing the likelihood of wear-induced leakage.

The slit in air manifold 83 conducts the fiber-forming material to orifices drilled or machined in tip 90 whereupon the fiber-forming material exits die 80 as a series of small diameter filaments. Meanwhile, air entering air manifold 83 through ports 94*a* and 94*b* impinges upon the filaments, attenuating them into fibers as or shortly after they pass through slit 100 in air knife 92.

Figure 9:
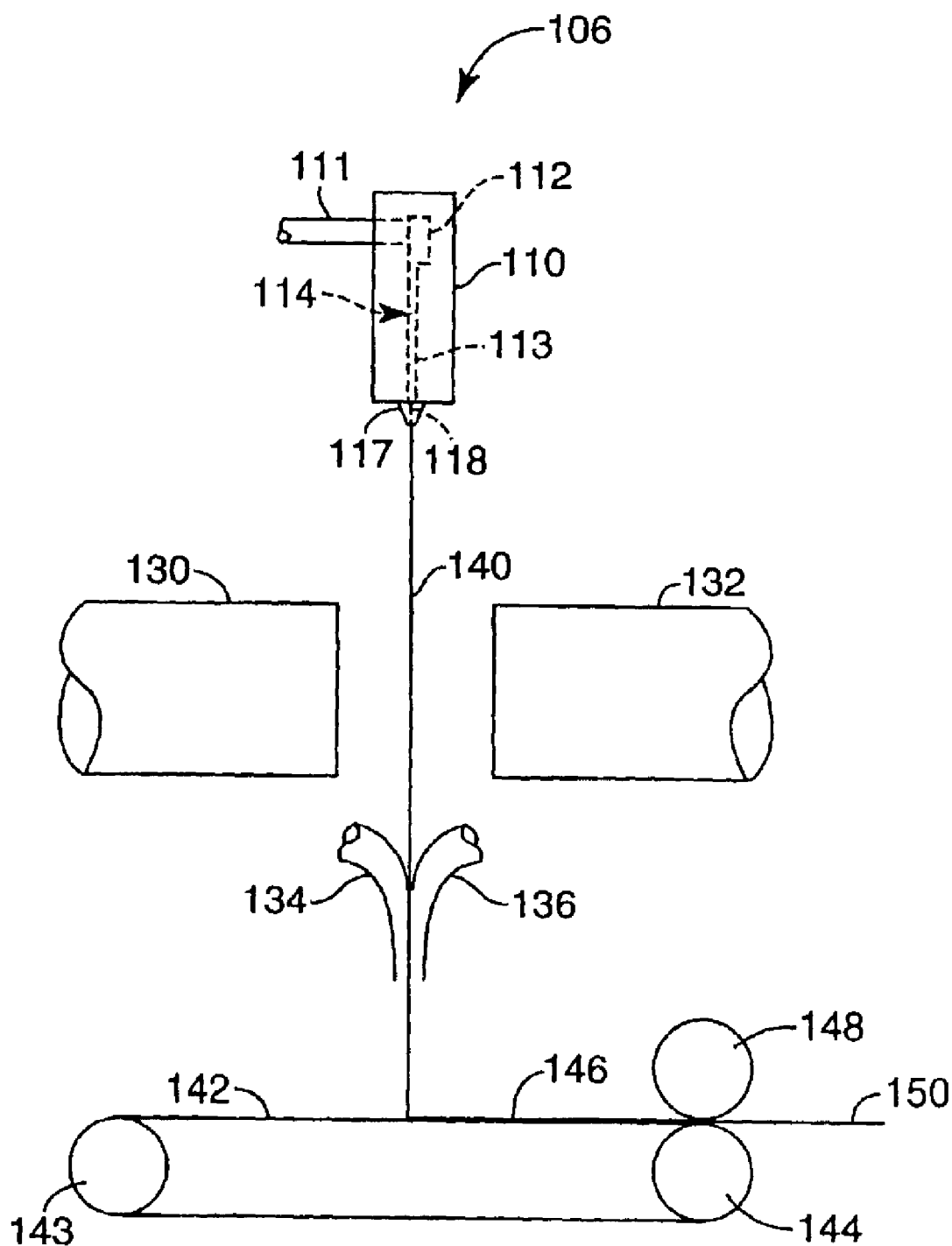
FIG. 9 is a schematic sectional view of a spun bond die of the invention.

Nonwoven dies of the invention for use in the spun bond process also have a substantially uniform residence time for fiber-forming material passing through the die cavity. In general, the fabrication of such spun bond dies will be simpler than fabrication of meltblowing dies such as those shown in FIG. 3 through FIG. 8, since the pressurized attenuating fluid passages in the die body can be omitted. FIG. 9 shows a preferred spun bond system 106 of the invention. Fiber-forming material enters generally vertical die 110 via inlet 111, flows downward through manifold 112 and die slot 113 of die cavity 114 (all shown in phantom), and exits die cavity 114 through orifices such as orifice 118 in die tip 117 as a series of downwardly-extending filaments 140. A quenching fluid (typically air) conducted via ducts 130 and 132 solidifies at least the surfaces of the filaments 140. The at least partially solidified filaments 140 are drawn toward collector 142 while being attenuated into fibers by generally opposing streams of attenuating fluid (typically air) supplied under pressure via ducts 134 and 136. Collector 142 is carried on rollers 143 and 144. Calendaring roll 148 opposite roll 144 compresses and point-bonds the fibers in web 146 to produce calendared web 150. Further details regarding the manner in which spun bonding would be carried out using such an apparatus will be familiar to those skilled in the art.

Those skilled in the art will appreciate that the nonwoven dies of the invention do not need to be planar. A die of the invention can be configured using an annular die cavity having a central axis of symmetry, for forming a cylindrical array of filaments. A die having a plurality of nonplanar (curved) die cavities whose shape if made planar would be like that shown in FIG. 3 can also be arranged around the circumference of a cylinder to form a larger diameter cylindrical array of filaments than would be obtained using only a single annular die cavity of similar die depth. A plurality of nested annular nonwoven dies of the invention can also be arranged around a central axis of symmetry to form a multilayered cylindrical array of filaments.

Preferred embodiments of the nonwoven dies of the invention can be designed using fluid flow equations based on the behavior of a power law fluid obeying the equation:

$$\eta = \eta^\circ \gamma^{n-1} \tag{1}$$

where:

$\eta$ = viscosity $\eta^\circ$ = the reference viscosity at a reference shear rate $\gamma^0$ n = power law index $\gamma$ = shear rate Referring again to FIG. 3, an x-y coordinate axis has been overlaid upon die cavity 50, with the x-axis corresponding generally to the die cavity outlet edge (or in other words, the inlet side of die tip 57) and the y-axis corresponding generally to the centerline of die cavity 50. Die cavity 50 has a half width of dimension b and an overall width of dimension 2·b. The fluid flow rate $Q_m(x)$ in the manifold at position x can be assumed for mass balance reasons to equal the flow rate of material exiting the die cavity between positions x and b, and can also be assumed to equal the average velocity of the fluid in the manifold times the cross-sectional area of the manifold arm:

$$Q_m(x) = (b-x)h\bar{v}_s = WH(x)\bar{v}_m \tag{2}$$

where:

$Q_m(x)$ is the fluid flow rate in the manifold arm at position x $\bar{v}_m$ is the average fluid velocity in the manifold arm b is the half width of the die cavity $\bar{v}_s$ is the average fluid velocity in the slot h is the slot depth H(x) is the manifold arm depth at position x W is the manifold arm width.

The manifold arm width is assumed to be some appreciable dimension, e.g., a width of 1 cm, 1.5 cm, 2 cm, etc. A value for the slot depth h can be chosen based on the range of rheologies of the fiber-forming fluids that will flow through the die cavity and the targeted pressure drop across the die. The fluid flow in the manifold is assumed to be nonturbulent and occurring in the direction of the manifold arm. The fluid flow in the slot is assumed to be laminar and occurring in the −y direction. The dotted lines A and B in FIG. 3 represent lines of constant pressure, normal to the fluid flow direction. The pressure gradient in the slot is related to the pressure gradient in the manifold arm by the equation:

$$\left(\frac{dp}{dy}\right)_{slot} = \left(\frac{dp}{dt}\right)_{manifold\ arm} \left(\frac{\Delta\zeta}{\Delta y}\right) \tag{3}$$

where $\Delta\zeta$ is the hypotenuse of the triangle formed by $\Delta x$ and $\Delta y$, shown in FIG. 3 where dotted lines A and B intersect the contour line C. between right-hand manifold arm 52*b* and slot 53. The equation:

$$\Delta\zeta = \Delta y \left[1 + \left(\frac{dy}{dx}\right)^2\right]^{1/2} \tag{4}$$

can be found using the Pythagorean rule. The derivative dx/dy is the inverse of the slope of the contour line C. Combining equations (3) and (4) gives:

$$\frac{dy}{dx} = \left[ \left[ \left( \frac{dp}{dy} \right)_{slot} / \left( \frac{dp}{d\zeta} \right)_{manifold} \right]^2 - 1 \right]^{1/2}. \quad (5)$$

The fluid pressure gradient $\Delta p$ and shear $\gamma_w$ at the die cavity wall can be calculated by assuming steady flow in both the slot and manifold, and neglecting the influence of any fluid exchange. Assuming that the fluid obeys the power law model of viscosity:

$$n = n^o \left| \frac{\gamma}{\gamma^o} \right|^{n-1} \quad (6)$$

the pressure gradient and shear at the wall can be calculated for the slot as:

$$\Delta p = \frac{(-2n^o \gamma^o)}{n} \left( \frac{-\gamma_w}{\gamma^o} \right)^n \quad (7)$$

$$\gamma_w = -\left( \frac{1}{n} + 2 \right) \frac{2\overline{v}}{h}. \quad (8)$$

An additional boundary condition is set by assuming that the shear rate at the wall of the slot will be the same as the shear rate at the wall of the manifold:

$$\gamma_s = \gamma_m \text{ at the wall.} \quad (9)$$

This makes the design independent of melt viscosity and requires that the viscosity be the same everywhere in the die cavity, at least at the wall. Requiring a uniform shear rate at the wall of both the manifold and slot, and requiring conservation of mass, gives the equation:

$$H = h \left( \frac{b-x}{W} \right)^{1/2} \quad (10)$$

and an equation for the slope of the manifold arm contour C:

$$\frac{dy}{dx} = -\left( \frac{b-x}{W} - 1 \right)^{1/2} \quad (11)$$

which can be integrated to find:

$$y(x) = 2W \left( \frac{b-x}{W} - 1 \right)^{1/2}. \quad (12)$$

Equation (12) can be used to design the contour of the manifold arm.

The manifold arm depth $H(x)$ can be calculated using the equation:

$$H(x) = \left( \frac{b-x}{W} \right)^{1/2}. \quad (13)$$

A die cavity designed using the above equations can have a uniform residence time, as can be seen by dividing the numerator and denominator of equation (3) by $\Delta t$ to yield the equation:

$$\frac{dp}{dy} = \frac{dp}{d\zeta} \frac{\left( \frac{\Delta \zeta}{\Delta t} \right)}{\left( \frac{\Delta y}{\Delta t} \right)}. \quad (14)$$

Equation (14) can be manipulated to give:

$$\frac{dp}{dy} = \frac{-1}{\left[ \left( \frac{\overline{v}_m}{\overline{v}_s} \right)^2 - 1 \right]^{1/2}} \quad (15)$$

which through further manipulation leads to:

$$\Delta t = \frac{\Delta y}{\overline{v}_s} = \frac{\Delta \zeta}{\overline{v}_m}. \quad (16)$$

The residence time in the manifold is accordingly the same as the residence time in the slot. Thus along any path, the fluid experiences not only the same shear rate but also experiences that rate for the same length of time. This promotes a relatively uniform thermal and shear history for the fiber-forming material stream across the width of the die cavity.

Those skilled in the art will appreciate that the above-described equations provide an optimized die cavity design. An optimized die cavity design, while desirable, is not required to obtain the benefits of the invention. Deliberate or accidental variation from the optimized design parameters provided by the equations can still provide a useful die cavity design having substantially uniform residence time. For example, the value for y(x) provided by equation (12) may vary, e.g., by about ±50%, more preferably by about ±25%, and yet more preferably by about ±10% across the die cavity. Expressed somewhat differently, the die cavity manifold arms and die slot can meet within curves defined by the equation:

$$y(x) = (1 \pm 0.5) 2W \left( \frac{b-x}{W} - 1 \right)^{1/2} \quad (17)$$

and more preferably within curves defined by the equation:

$$y(x) = (1 \pm 0.25) 2W \left( \frac{b-x}{W} - 1 \right)^{1/2} \quad (18)$$

and yet more preferably within curves defined by the equation:

$$y(x) = (1 \pm 0.1) 2W \left( \frac{b-x}{W} - 1 \right)^{1/2} \quad (19)$$

where x, y, b and W are as defined above.

Those skilled in the art will also appreciate that residence time does not need to be perfectly uniform across the die cavity. For example, as noted above the residence time of fiber-forming material streams within the die cavity need only be substantially uniform. More preferably, the residence time of such streams is within about ±50% of the average residence time, more preferably within about ±10% of the average residence time. A tee slot die or coathanger die typically exhibits a much larger variation in residence time across the die. For tee slots dies, the residence time may vary by as much as 200% or more of the average value, and for coathanger dies the residence time may vary by as much as 1000% or more of the average value.

Those skilled in the art will also appreciate that the above-described equations were based upon a die cavity design having a manifold with a rectangular cross-sectional shape, constant width and regularly varying depth. Suitably configured manifolds having other cross-sectional shapes, varying widths or other depths might be substituted for the design shown in FIG. 3 and still provide uniform or substantially uniform residence time throughout the die cavity. Similarly, those skilled in the art will appreciate that the above-described equations were based upon a die cavity design having a slot of constant depth. Suitably configured die cavity designs having slots with varying depths might be substituted for the design shown in FIG. 3 and still provide uniform or substantially uniform residence time throughout the die cavity. In each case the equations will become more complicated but the underlying principles described above can still apply.

A film extrusion die based on similar equations was described by Professor H. Henning Winter of the Department of Chemical Engineering of the University of Massachusetts and Professor H. G. Fritz of the Institut für Kunststoffechnologie of the University of Stuttgart, see Winter, H. H. and Fritz, H. G., "Design of Dies for the Extrusion of Sheets and Annular Parisons: The Distribution Problem" Polym Eng Sci 26:543–553 (1986) and Published German Patent Application No. DE 29 33 025 A1 (1981). Owing in part to the long front-to-back depth of the Winter film die, it has not been widely used for film manufacturing. The dies of the present invention have a die cavity with similar rheological characteristics and a plurality of orifices at the die cavity outlet. Fiber-forming materials passing through such orifices typically must be heated to much higher temperatures and typically must have much lower viscosities that is the case for extrudable materials passing through a film die. Compared to conventional film extrusion, meltblowing and the spun bond process subject the fiber-forming material to substantially greater thinning or even thermal degradation and tend to magnify the effects of residence time differences upon the extruded filaments. Use of a die cavity having substantially uniform residence time can provide a significant improvement in nonwoven web uniformity. The uniformity improvement can be more substantial than that obtained when a Winter film die is employed to form a film. Preferred dies of the invention can form nonwoven webs whose characteristics are substantially uniform for all fibers collected along the die cavity outlet, because each die orifice receives a fiber-forming material stream having a similar thermal history. In addition, because the present invention permits a plurality of narrow width die cavities to be arranged to form a wide nonwoven web, the die depth disadvantage associated with wide Winter film dies is not a limiting factor.

For the dies of the invention, the shear rate at the die cavity wall and the shear stress experienced by the flowing fiber-forming material can be the same or substantially the same for any point on the wetted surface of the die cavity wall. This can make the dies of the invention relatively insensitive to alteration in the viscosity or mass flow rate of the fiber-forming material, and can enable such dies to be used with a wide variety of fiber-forming materials and under a wide variety of operating conditions. This also can enable the dies of the invention to accommodate changes in such conditions during operation of the die. Preferred dies of the invention can be used with viscoelastic, shear sensitive and power law fluids. Preferred dies of the invention may also be used with reactive fiber-forming materials or with fiber-forming materials made from a mixture of monomers, and may provide uniform reaction conditions as such materials or monomers pass through the die cavity. When cleaned using purging compounds, the constant wall shear stress provided by the dies of the invention may promote a uniform scouring action throughout the die cavity, thus facilitating thorough and even cleaning action.

Preferred dies of the invention may be operated using a flat temperature profile, with reduced reliance on adjustable heat input devices (e.g., electrical heaters mounted in the die body) or other compensatory measures to obtain uniform output. This may reduce thermally generated stresses within the die body and may discourage die cavity deflections that could cause localized basis weight nonuniformity. Heat input devices may be added to the dies of the invention if desired. Insulation may also be added to assist in controlling thermal behavior during operation of the die.

Preferred dies of the invention can produce highly uniform webs. If evaluated using a series (e.g., 3 to 10) of 0.01 $m^2$ samples cut from the near the ends and middle of a web (and sufficiently far away from the edges to avoid edge effects), preferred dies of the invention may provide nonwoven webs having basis weight uniformities of ±2% or better, or even ±1% or better. Using similarly-collected samples, preferred dies of the invention may provide nonwoven webs comprising at least one layer of melt blown fibers whose polydispersity differs from the average fiber polydispersity by less than ±5%, more preferably by less than ±3%.

A variety of synthetic or natural fiber-forming materials may be made into nonwoven webs using the dies of the invention. Preferred synthetic materials include polyethylene, polypropylene, polybutylene, polystyrene, polyethylene terephthalate, polybutylene terephthalate, linear polyamides such as nylon 6 or nylon 11, polyurethane, poly (4-methyl pentene-1), and mixtures or combinations thereof. Preferred natural materials include bitumen or pitch (e.g., for making carbon fibers). The fiber-forming material can be in molten form or carried in a suitable solvent. Reactive monomers can also be employed in the invention, and reacted with one another as they pass to or through the die. The nonwoven webs of the invention may contain a mixture of fibers in a single layer (made for example, using two closely spaced die cavities sharing a common die tip), a plurality of layers (made for example, using a die such as shown in FIG. 7), or one or more layers of multicomponent fibers (such as those described in U.S. Pat. No. 6,057,256).

The fibers in the nonwoven webs of the invention may have a variety of diameters. For example, melt blown fibers in such webs may be ultrafine fibers averaging less than 5 or even less than 1 micrometer in diameter; microfibers averaging less than about 10 micrometers in diameter; or larger fibers averaging 25 micrometers or more in diameter. Spun bond fibers in such webs may have diameters of about 10 to 100 micrometers, preferably about 15 to 50 micrometers.

The nonwoven webs of the invention may contain additional fibrous or particulate materials as described in, e.g., U.S. Pat. Nos. 3,016,599, 3,971,373 and 4,111,531. Other adjuvants such as dyes, pigments, fillers, abrasive particles, light stabilizers, fire retardants, absorbents, medicaments, etc., may also be added to the nonwoven webs of the invention. The addition of such adjuvants may be carried out by introducing them into the fiber-forming material stream, spraying them on the fibers as they are formed or after the nonwoven web has been collected, by padding, and using other techniques that will be familiar to those skilled in the art. For example, fiber finishes may be sprayed onto the nonwoven webs to improve hand and feel properties.

The completed nonwoven webs of the invention may vary widely in thickness. For most uses, webs having a thickness between about 0.05 and 15 centimeters are preferred. For some applications, two or more separately or concurrently formed nonwoven webs may be assembled as one thicker sheet product. For example, a laminate of spun bond, melt blown and spun bond fiber layers (such as the layers described in U.S. Pat. No. 6,182,732) can be assembled in an SMS configuration. Nonwoven webs of the invention may also be prepared by depositing the stream of fibers onto another sheet material such as a porous nonwoven web that will form part of the completed web. Other structures, such as impermeable films, may be laminated to a nonwoven web of the invention through mechanical engagement, heat bonding, or adhesives.

The nonwoven webs of the invention may be further processed after collection, e.g., by compacting through heat and pressure to cause point bonding of spun bond fibers, to control sheet caliper, to give the web a pattern or to increase the retention of particulate materials. Webs of the invention may be electrically charged to enhance their filtration capabilities as by introducing charges into the fibers as they are formed, in the manner described in U.S. Pat. No. 4,215,682, or by charging the web after formation in the manner described in U.S. Pat. No. 3,571,679.

The nonwoven webs of the invention may have a wide variety of uses, including filtration media and filtration devices, medical fabrics, sanitary products, oil adsorbents, apparel fabrics, thermal or acoustical insulation, battery separators and capacitor insulation.

Various modifications and alterations of this invention will be apparent to those skilled in the art without departing from the scope and spirit of this invention. This invention should not be restricted to that which has been set forth herein only for illustrative purposes.

What is claimed is:

1. A method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web.

2. A method according to claim 1 wherein the fiber-forming material exits the die cavity as filaments having the same or substantially the same physical or chemical properties.

3. A method according to claim 1 wherein the die cavity is part of a meltblowing die and the attenuating fluid is heated.

4. A method according to claim 1 wherein the die cavity has a substantially uniform shear rate and the calculated, simulated or experimentally measured residence time for any portion of a stream of the fiber-forming material flowing through the die cavity is within about ±50% of the average calculated, simulated or experimentally measured residence time for the entire stream.

5. A method according to claim 4 wherein the calculated, simulated or experimentally measured residence time for any portion of a stream of the fiber-forming material flowing through the die cavity is within about ±10% of the average calculated, simulated or experimentally measured residence time for the entire stream.

6. A method according to claim 1 wherein the polydispersity of the fibers differs from the average fiber polydispersity by less than ±5%.

7. A method according to claim 1 wherein the nonwoven web has a basis weight uniformity of about ±2% or better.

8. A method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web, wherein a plurality of such die cavities are arranged to form a wider or thicker web than would be obtained using only a single such die cavity.

9. A method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web, wherein a plurality of die cavities having widths less than about 0.5 meters are arranged in a side-by-side array that can form a uniform or substantially uniform nonwoven web having a width of about one meter or more.

10. A method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web, wherein a plurality of die cavities having widths less than about 0.33 meters are arranged in a side-by-side array that can form a uniform or substantially uniform nonwoven web having a width of about one meter or more.

11. A method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web, wherein a plurality of die cavities having widths less than about 0.25 meters are arranged in a side-by-side array that can form a uniform or substantially uniform nonwoven web having a width of one meter or more.

12. A method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web, wherein the nonwoven web has a width greater than about 0.5 meters.

13. A method according to claim 12 wherein the nonwoven web has a width greater than about 1 meter.

14. A method according to claim 13 wherein the nonwoven web has a width greater than about 2 meters.

15. A method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web, wherein a plurality of such die cavities are arranged in a stack.

16. A method according to claim 1 wherein the die cavity is part of an annular die having a central axis of symmetry.

17. A method according to claim 1 wherein the die cavity can be operated using a flat temperature profile.

18. A method according to claim 1 wherein the die cavity has a generally planar die slot and an outlet and the die cavity outlet is angled away from the plane of the die slot.

19. A method according to claim 1 wherein the die cavity has a manifold having a wall and a die slot having a wall, and the shear rate at the slot wall is substantially the same as the shear rate at the manifold wall.

20. A method for forming a fibrous web comprising flowing fiber-forming material through a die cavity having a substantially uniform residence time and then through a plurality of orifices to form filaments, using air or other fluid to attenuate the filaments into fibers and collecting the attenuated fibers as a nonwoven web, wherein the die cavity has an outlet edge and a centerline, and further has manifold arms and a die slot that meet within curves defined by the equation:

$$y(x) = (1 \pm 0.5)2W\left(\frac{b-x}{W} - 1\right)^{1/2}$$

where x and y are coordinates in an x-y coordinate space in which the x-axis corresponds to the outlet edge and the y-axis corresponds to the centerline, b is the die cavity half-width and W is the manifold arm width.

21. A method according to claim 20 wherein the manifold arms and die slot meet within curves defined by the equation $$y(x) = (1 \pm 0.1)2W\left(\frac{b-x}{W} - 1\right)^{1/2}.$$

* * * * *